Aug. 11, 1959 F. A. KROHM 2,899,526
DEFROSTER
Filed Dec. 7, 1956
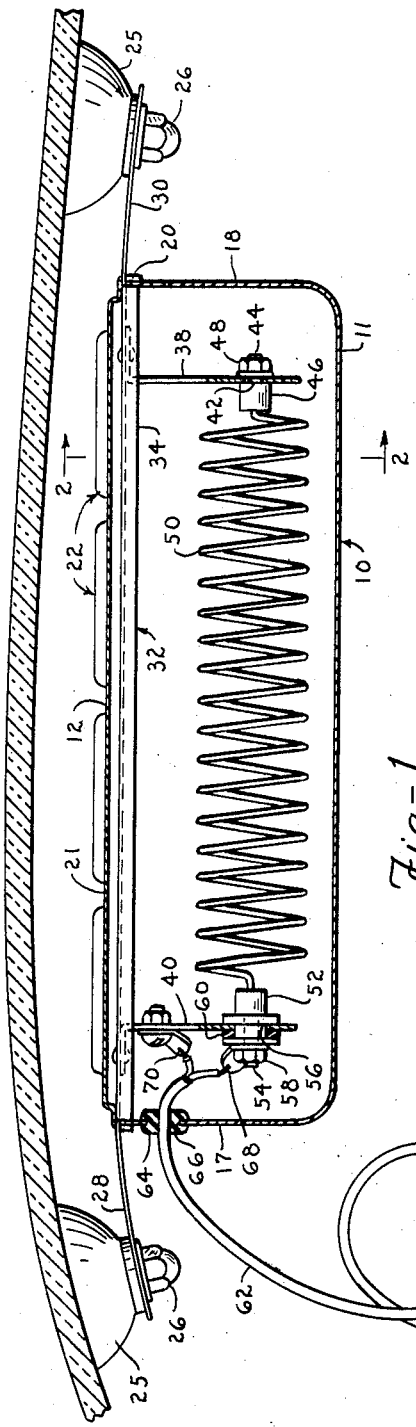
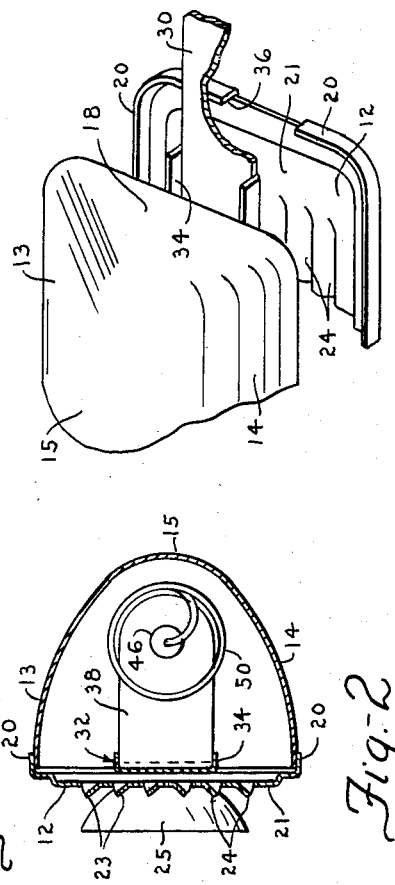
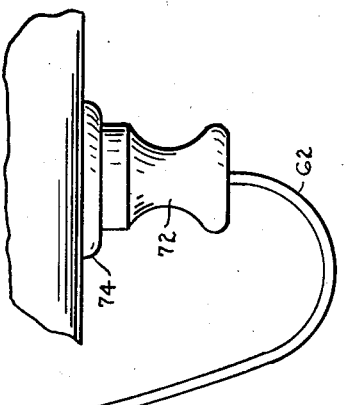
INVENTOR.
FRED A. KROHM
BY
Redrow & Recktenwald
ATTORNEYS United States Patent Office 2,899,526
Patented Aug. 11, 1959

2,899,526

DEFROSTER

Fred A. Krohm, Hobart, Ind., assignor to The Anderson Company, a corporation of Indiana Application December 7, 1956, Serial No. 627,022

4 Claims. (Cl. 219—19)

This invention relates to a defrosting unit and more specifically to a detachable unit for defrosting windshields of motor vehicles, or the like.

Currently, many different systems are used to keep the windshield of a motor vehicle free from ice, mist, condensation, and other moisture deposit hazards that affect the clear vision of the operator of the vehicle. These present-day systems generally make use of a flow of heated air over the inner surface of the windshield as the means for keeping the windshield clear. In the modern vehicle with a wrap-around windshield, however, there are localized areas that cannot be reached with such an air blast coming from the conventional built-in defroster. Further, none of such means are designed to defrost the windows of the doors of a vehicle. There have been other proposals, few of which are in actual use, that entail the use of heated wiper blades, chemical solutions, or chemical coatings, all of which accomplish in some limited degree the result desired; but in so doing either the wiper blade is consumed in a short period of time or the blades scratch the windshield, or the chemical means discolors the windshield to such an extent that it has to be replaced frequently at a considerable expense.

It is, therefore, a principal object of this invention to overcome the above-noted disadvantages of the prior art and to provide an improved defroster unit that is capable of clearing relatively wide areas of a windshield efficiently and cheaply.

It is another object of this invention to provide a defroster which is simple, compact, durable, and readily attachable and detachable at any part of a wrap-around windshield or other glass area to be defrosted.

It is still another object of this invention to provide an electrically heated defroster having high heating efficiency that will not overload the battery of the vehicle.

A further object of this invention is to provide a defroster wherein the heat produced is directed onto the windshield to be cleared by convective flow and without the use of fans or the like.

A still further object of this invention is to provide a defroster that is not only easy to manufacture and produce, but also is simple to install and repair.

These and other objects and advantages of the invention will become apparent as the description of the same proceeds, and the invention will be best understood from a consideration of the following detailed description taken in connection with the accompanying drawings forming part of this specification with the understanding, however, that the invention is not confined to any strict conformity with the showing of the drawing, but may be changed or modified so long as such changes or modifications mark no material departure from the salient features of the invention as expressed in the appended claims.

In the drawings:

Figure 1 is a top plan view partially in section of the defroster showing my improved structure;

Figure 2 is a cross-sectional view taken along the line 2—2 of Figure 1; and

Figure 3 is an exploded view of a part of one end of the casing showing the casing construction of my improved defroster.

The defroster structure or assembly as exemplified in the drawings comprises a casing or housing 10 having a body member 11 open along one side thereof over which is fastened a cover member 12. The body member 11 is substantially rectangular in cross section along a plane lying parallel to the open side thereof, and has two side walls 13 and 14 converging toward each other which are joined by a curved wall 15 in such a manner that a cross section taken through the walls on a plane disposed substantially perpendicular to the plane of the open side is substantially parabolic in form. A pair of end walls 17 and 18 are formed on the ends of the walls 13, 14 and 15 so as to close off the body member 11 whereby a substantially closed housing will be formed when the cover member 12 is assembled over the open side of the body member 11.

The cover member 12 has a right angularly disposed flange portion 20 formed around the peripheral portion thereof which is adapted to engage with or grip the outer edge portions of the open side of the body member 11 for holding said cover 12 on said body 11. The face portion 21 of the cover member 12 has formed therein a plurality of louvers 22 of which one set 23 is directed upwardly as shown in Figure 2 while the second set of louvers 24 is directed downwardly, for a purpose that will appear more fully below.

The housing 10 is supported on the window that is to be defrosted with the louvered cover disposed substantially parallel to and spaced from said window by means of a pair of rubber suction cups 25 or the like having threaded stem elements which are attached by cap nuts 26 to the opposite flat resilient end portions 28, 30 of an elongated support bar 32. The bar 32 has a flanged central portion 34 disposed normally within the housing between said flat end portions 28, 30. The central portion 34 is adapted to engage with the inner surface of the end walls 17 and 18 to position the bar 32 relative to the housing. The end portions 28, 30 are adapted to extend through and beyond a pair of openings 36 formed in the flange 20 on the opposite ends of the cover 12 so that the central portion 34 of the bar 32 is substantially rigid and the end portions are comparatively flexible to permit a controlled amount of movement of the housing relative to the windshield for absorbing road shocks and the like and to fit the defroster to the curvature of a windshield or the like. The openings 36 in the flange 20 integral with cover 12 are of approximately the same size as the width of the end portions 28, 30 of the bar 32 so that said bar can be held engaged in assembled relation with the cover by means of the frictional engagement therebetween.

A pair of L-shaped carrier members 38, 40 are riveted or otherwise secured to the bar and are disposed so as to extend into the casing or housing in spaced-apart relationship. The carrier 38 has an aperture 42 through the extended end portion thereof which is adapted to receive the threaded end 44 of the anchor element 46 that is fastened thereto by means of the nut 48. A heating coil 50 is attached and electrically grounded at one end to said anchor element 46 and is attached at the other end to an insulated anchor element 52 which has an electrical conductor connected to a threaded end 54 held in an aperture 56 in the carrier 40 by means of nut 58. A washer 60 of insulating material is seated between the carrier 40 and the threaded conductor end 54 of anchor element 52 to prevent electrical conduction therebetween. An electrical conductor, such as wire 62, extends through the rubber grommet 64 which is seated in an aperture 66 formed in end wall 17 of the housing and has one wire 68 thereof fastened to the conductor post 54 of anchor element 52 and has the other wire 70 thereof grounded to the carrier 40 according to conventional electrical practices. The other end of the electrical conductor 62 is attached to an electric plug 72 of the type that is adapted to be inserted into the cigar lighter receptacle 74 of an automotive vehicle for connection to a source of electrical energy for heating the coil 50.

The parabolically shaped body member can be coated on the inside with a reflective material so as to reflect the heat generated by the heating coil 50 toward the cover member of the housing. Although the heater will function to some degree with a housing 10 of a different shape in cross section, the parabolic cross section has some particular advantages. With the axis of the heating coil located substantially coaxial with the axis of the parabola, the advantage of a parabolic reflector will be realized, that is, energy emitted from a source adjacent the axis of the parabola will be reflected from the surface of the parabola along lines substantially parallel to the symmetric axis of the parabola. So that, thus, any heat rays flowing from the coil 50 will strike the inner surface of the housing and will be reflected directly toward the louvered cover 12.

When it is desired to clear any window of the car—such as the windshield—of ice, snow, frost, or the like, it is only necessary to attach the defroster by means of the suction cups 25 to the inside and bottom portion thereof in a manner which will not obstruct the vision of the vehicle operator. Upon inserting the plug 72 into the cigar lighter outlet, the heating coil 50 will become hot and begin to generate heat which will be reflected to the front cover 12 of the housing. Since the louvers 22 of the front cover are oppositely directed, the radiant heat will be reflected again both upwardly and downwardly from the housing against the windshield. Also, the air within the housing will become heated and a convection flow of heated air will take place under the guidance of the louvers so that in a relatively short period of time, the moisture deposit on the windshield will be dissipated and the driver may proceed in relative safety.

In this description, I have shown and described the preferred form of my improved defrosting device which is capable of accomplishing the objects of my invention efficiently, simply, and cheaply.

It may be mentioned that the suction cups which are employed to secure the defroster to the windshield, being preferably of rubber, serve as an insulation between the housing and the windshield so that an undue degree of heat from the housing 10 will not be conducted directly to local areas of the glass, but will rather be carried by warm air and radiated to any desired area of the windshield such as may not be reached with the conventional defrosting systems built into the modern car.

Having thus described my invention, it is obvious that various modifications may be made in the same without departing from the spirit of my invention; therefore, I do not wish to be limited to the exact form, construction, arrangement, and combination of parts herein shown and described.

I claim:

1. In a defroster the combination of a housing having an open side, a cover member having a perpendicularly disposed flange around the periphery thereof, a pair of aligned notches formed in the opposite ends of said flange, a heater, a support bar for said heater having a channel-shaped mid-portion and outwardly extending flat end portions, said channel-shaped mid-portion seating in said cover member with the flat end portions extending through and engaging with the edges of the notches in the flange of the cover member, the flange of the cover member engaging with the edge portions of the housing adjacent the open side of the housing for holding the heater support bar assembled in the housing with the ends of the channel of the support bar engaging with end portions of the housing whereby the heater carried by the support bar is fixedly positioned within the housing along a preselected axis.

2. In a defroster the combination of a housing comprising a substantially rectangularly shaped body member open along one side thereof, a louvered, rectangularly shaped cover member closing the open side of said body member, an elongated channel-shaped support bar passing lengthwise through said housing and having flat end portions extending beyond the ends thereof, fastening means carried by said end portions of said bar for attachment to a surface, a pair of spaced apart upstanding carrier members fastened to said bar within said housing, a coiled heating unit supported between said carrier members, electrical conducting means passing through said housing and having one end thereof connected to one of said carrier members and to said heating unit, and means carried by the other end of said conducting means adapted to be connected to an electric power supply.

3. A defroster for windshields, comprising an elongated, closed housing of substantially parabolic cross-section, the inner curved surface of said housing being highly reflective, and the front wall of said housing being formed with a series of louvers one above the other and extending lengthwise the housing, the louvers of the upper half of said front wall opening upwardly, while the louvers of the lower half open downwardly, an elongated heating element mounted in said housing and extending along the mid-portion of said front wall, and means for connecting said unit with a source of energy, whereby radiation from said heater element is directed vertically along the surface of the glass and convection currents pass through the lower louvers and out through the upper louvers and flow along the windshield glass.

4. In a defroster for windshields, the combination of an elongated housing of dimensions to fit onto the inner wall of the windshield glass without material obstruction of driver vision, said housing being parabolically shaped in transverse cross section, an elongated heating element mounted in said housing with its axis substantially coaxial with the axis of said housing, a cover closing the open side of said housing and positioned substantially parallel with and contiguous to said glass, said cover being formed with a multiplicity of louver openings to direct radiation from said heater along and onto the surface of the glass while permitting convection currents to circulate therethrough, and a resilient arm extending from a point at each end of the housing proximate the glass and parallel with said cover for mounting the housing upon the glass.

References Cited in the file of this patent

UNITED STATES PATENTS

| | | |
|---|---|---|
| 1,603,773 | Horn | Oct. 19, 1926 |
| 1,700,544 | Ruka | Jan. 29, 1929 |
| 1,802,271 | Reig | Apr. 21, 1931 |
| 1,861,041 | Zaiger | May 31, 1932 |
| 1,934,565 | Siers | Nov. 7, 1933 |
| 2,474,472 | Doyle | June 28, 1949 |
| 2,590,336 | Mast | Mar. 25, 1952 |
| 2,733,331 | Call | Jan. 31, 1956 |
| 2,803,733 | Kashirsky | Aug. 20, 1957 |

FOREIGN PATENTS

| | | |
|---|---|---|
| 501,683 | Great Britain | Mar. 3, 1939 |
| 545,019 | Great Britain | May 7, 1942 |
| 643,954 | Great Britain | Sept. 27, 1950 |